United States Patent
Vagenende et al.

(10) Patent No.: US 12,472,727 B2
(45) Date of Patent: Nov. 18, 2025

(54) THERMOFORMABLE SHEET AND THERMOFORMED PACKAGE

(71) Applicant: AMCOR FLEXIBLES NORTH AMERICA, INC., Neenah, WI (US)

(72) Inventors: Maxime Vagenende, Serskamp (BE); Bert De Schoenmaker, Laarne (BE)

(73) Assignee: AMCOR FLEXIBLES NORTH AMERICA, INC., Neenah, WI (US)

( * ) Notice: Subject to any disclaimer, the term of this patent is extended or adjusted under 35 U.S.C. 154(b) by 45 days.

(21) Appl. No.: 18/687,742

(22) PCT Filed: Sep. 3, 2021

(86) PCT No.: PCT/US2021/048967
§ 371 (c)(1),
(2) Date: Feb. 28, 2024

(87) PCT Pub. No.: WO2023/033830
PCT Pub. Date: Mar. 9, 2023

(65) Prior Publication Data
US 2024/0359439 A1  Oct. 31, 2024

(51) Int. Cl.
*B32B 27/08* (2006.01)
*B32B 27/30* (2006.01)
(Continued)

(52) U.S. Cl.
CPC ............ *B32B 27/08* (2013.01); *B32B 27/306* (2013.01); *B32B 27/32* (2013.01); *B65D 75/22* (2013.01);
(Continued)

(58) Field of Classification Search
CPC ......... B65D 75/22; B32B 27/08; B32B 27/32; B32B 27/306
(Continued)

(56) References Cited

U.S. PATENT DOCUMENTS 6,815,057 B2 * 11/2004 Hodson .................. B32B 27/08
428/354
7,891,516 B2 * 2/2011 Takahashi .......... B65D 77/2044
229/123.1
(Continued)

FOREIGN PATENT DOCUMENTS

EP  1776417 B1  9/2009
EP  2316644 A2  5/2011
(Continued)

OTHER PUBLICATIONS

PCT International Search Report, International Application No. PCT/US2021/048967, issued Sep. 3, 2021, 4 pages.
(Continued)

*Primary Examiner* — Rafael A Ortiz (57) ABSTRACT

A thermoformable sheet includes an exterior film, a printed pigment layer, an adhesive layer, an inner layer, and an interior sealing layer. The exterior film includes between 50% and 100% polyolefin-based polymers, by weight. The inner layer includes between 60% and 100% of high-density polyethylene polymer, by weight. The inner layer further includes a thickness between 100 microns and 350 microns. The printed pigment layer and the adhesive layer are located between the exterior film and the inner layer.

20 Claims, 4 Drawing Sheets

(51) Int. Cl.
    *B32B 27/32*    (2006.01)
    *B65D 75/22*    (2006.01)
(52) U.S. Cl.
    CPC ....... *B32B 2255/10* (2013.01); *B32B 2270/00* (2013.01); *B32B 2307/31* (2013.01); *B32B 2307/4023* (2013.01); *B32B 2307/516* (2013.01); *B32B 2307/718* (2013.01); *B32B 2307/7244* (2013.01); *B32B 2307/7246* (2013.01); *B32B 2307/7376* (2023.05); *B32B 2307/738* (2013.01); *B32B 2307/748* (2013.01); *B32B 2439/40* (2013.01)
(58) Field of Classification Search
    USPC ...................................................... 220/62.22
    See application file for complete search history.

(56) References Cited

U.S. PATENT DOCUMENTS

| | | | |
|---|---|---|---|
| 2007/0026250 A1* | 2/2007 | Hofmeister | B32B 37/06 |
| | | | 428/474.4 |
| 2008/0053608 A1 | 3/2008 | Wald et al. | |
| 2017/0369668 A1 | 12/2017 | Chen et al. | |
| 2018/0339498 A1* | 11/2018 | Zborowski | B32B 27/08 |
| 2021/0078780 A1* | 3/2021 | Huffer | B32B 27/306 |

FOREIGN PATENT DOCUMENTS

| | | | | |
|---|---|---|---|---|
| EP | 2520615 | B1 | 8/2016 | |
| EP | 3489009 | A1 | 5/2019 | |
| JP | S5989340 | A | 5/1984 | |
| JP | H02301433 | A | 12/1990 | |
| JP | H07156348 | A | 6/1995 | |
| JP | 2001096684 | A | 4/2001 | |
| JP | 2004017984 | A | 1/2004 | |
| JP | 2007137968 | A | 6/2007 | |
| JP | 2011005707 | * | 1/2011 | |
| JP | 2011005707 | A | 1/2013 | |
| JP | 2017154277 | A | 9/2017 | |
| JP | 2021504174 | A | 2/2021 | |
| JP | 2021109700 | A | 8/2021 | |
| WO | 9903750 | A1 | 1/1999 | |
| WO | 02074843 | A2 | 9/2002 | |
| WO | 2015187173 | A1 | 12/2015 | |
| WO | 2020204984 | A1 | 10/2020 | |
| WO | 2020204985 | A1 | 10/2020 | |
| WO | 2020205061 | A1 | 10/2020 | |
| WO | WO-2021011213 | A1 * | 1/2021 | ............. B32B 27/16 |

OTHER PUBLICATIONS

PCT International Search Report, International Application No. PCT/US2021/048971, issued May 4, 2022, 3 pages.
Third party observations submitted in EP Application No. 21786654.0 dated Aug. 14, 2025, 14 pages.

* cited by examiner

THERMOFORMABLE SHEET AND THERMOFORMED PACKAGE

TECHNICAL FIELD

The present application relates generally to a thermoformable sheet and a thermoformed package, and in particular to a thermoformable sheet which is recyclable, and a thermoformed package including the thermoformable sheet which is recyclable.

BACKGROUND

Various types of packages for storing products are known in the art. In one example, the packages may include a thermoformed tray forming a cavity in which the products are stored, and a lid sealed to the thermoformed tray to cover the cavity. In another example, the packages may include thermoformed pockets folded against each other to form and cover a cavity in which the products are stored.

The thermoformed tray and the thermoformed pockets of the packages may have complicated curved forms and sharp-edged shapes. In small dimensions, the complicated curved forms and sharp-edged shapes may present challenging demands on a thermoformability of films/sheets used to form the thermoformed tray and the thermoformed pockets.

Currently, the thermoformed tray and the thermoformed pockets of the packages are made by thermoforming a conventional thermoformable sheet (e.g., a thick polystyrene film or polyester film), especially when the packages have complicated shapes. However, such conventional thermoformable sheets are generally non-recyclable. Consequently, the packages made from the conventional thermoformable sheets may pose difficulties in recycling, may not be environmentally friendly, and may not be suitable for environmental sustainability.

SUMMARY

A thermoformable sheet has been developed which may be thermoformed into complicated shapes while being recyclable. Further, the thermoformable sheet may be thermoformed into a thermoformed package to contain a product. Specifically, the thermoformable sheet may be thermoformed into the thermoformed package having complicated curved forms and sharp-edged shapes in combination with a high-quality print.

One embodiment of the present disclosure is a thermoformable sheet. The thermoformable sheet includes an exterior film. The exterior film includes between 50% and 100% polyolefin-based polymers, by weight. The thermoformable sheet further includes a printed pigment layer, an adhesive layer, an inner layer, and an interior sealing layer. The inner layer includes between 60% and 100% of high-density polyethylene polymer, by weight. The inner layer further includes a thickness between 100 microns and 350 microns. The printed pigment layer and the adhesive layer are located between the exterior film and the inner layer.

The inner layer may impart a desired thermoformability to the thermoformable sheet. In other words, the inner layer may allow thermoforming of the thermoformable sheet into difficult and challenging shapes. In some cases, the inner layer may further impart ultraviolet barrier properties to the thermoformable sheet. Further, the inner layer including between 60% and 100% of high-density polyethylene polymer, by weight, may ensure that the thermoformable sheet is recyclable.

The exterior film may provide a substrate for reverse printing. The printed pigment layer may be deposited directly on the exterior film. Moreover, the exterior film may also help in achieving the desired thermoformability of the thermoformable sheet.

In some cases, the adhesive layer may include a recyclable adhesive, such as a plastomer adhesive. Consequently, the thermoformable sheet may be easier to recycle, as ethylene-vinyl acetate (EVA), which is typically used for adhesion, is considered as a contaminant in recycling streams.

The interior sealing layer may provide desired functionalities and properties to the thermoformable sheet, such as, peelability, barrier properties, seal initiation temperature, coefficient of friction requirements, etc. Furthermore, the interior sealing layer may allow the thermoformable sheet to be folded over on itself, and to be sealed by bonding the interior sealing layer to itself.

In some embodiments, the exterior film is oriented.

In some embodiments, the exterior film is unoriented.

In some embodiments, the exterior film includes between 50% and 100% polyethylene-based polymers, by weight.

In some embodiments, the exterior film includes between 50% and 100% polypropylene-based polymers, by weight.

In some embodiments, the printed pigment layer is directly adjacent to the exterior film.

In some embodiments, the thermoformable sheet further includes a thickness between 200 microns and 500 microns.

In some embodiments, the inner layer further includes between 2.5% and 30% of a hydrocarbon resin, by weight.

In some embodiments, the inner layer is unoriented.

In some embodiments, the interior sealing layer includes polyethylene-based polymers.

In some embodiments, the interior sealing layer includes polypropylene-based polymers.

In some embodiments, the thermoformable sheet further includes an overall composition of polyolefin of between 80% and 100%, by weight.

In some embodiments, the thermoformable sheet further includes an overall composition of polyethylene of between 80% and 100%, by weight.

In some embodiments, the thermoformable sheet further includes a barrier layer including an ethylene vinyl alcohol copolymer.

Another embodiment of the present disclosure is a thermoformable sheet. The thermoformable sheet includes an exterior film. The exterior film includes an oriented polyethylene-based film including a thickness between 6 microns and 50 microns. The thermoformable sheet further includes a printed pigment layer deposited directly on a surface of the exterior film. The thermoformable sheet further includes an adhesive layer and an inner layer. The inner layer includes between 60% and 100% of high-density polyethylene polymer, by weight. The inner layer further includes a thickness between 100 microns and 350 microns. The thermoformable sheet further includes an interior sealing layer including a polyethylene polymer. The printed pigment layer and the adhesive layer are located between the exterior film and the inner layer.

Another embodiment of the present disclosure is a thermoformed package containing a product. The package includes the thermoformable sheet according to the embodiments discussed above. The thermoformable sheet is thermoformed to create a product cavity.

In some embodiments, the package consists of the thermoformable sheet folded over on itself, and a seal formed by bonding the interior sealing layer of the thermoformable sheet to itself.

In some embodiments, the thermoformable sheet includes at least one tab located in a position such that the seal is between the at least one tab and the product cavity. The package can be opened manually by pulling on the at least one tab and peeling the seal.

In some embodiments, the package consists of the thermoformable sheet including the product cavity, a lidding material, and a seal bonding the interior sealing layer of the thermoformable sheet to the lidding material.

In some embodiments, the product is hermetically sealed inside the product cavity.

In some embodiments, the thermoformable sheet includes a first thermoformable sheet and a second thermoformable sheet. The package consists of the first and second thermoformable sheets, a seal bonding the interior sealing layer of the first thermoformable sheet to the interior sealing layer of the second thermoformable sheet, and the product cavity located between the first and second thermoformable sheets.

As discussed above, the thermoformable sheets of the present disclosure may be thermoformed into complicated shapes. The thermoformable sheet may allow the thermoformed package to have a complicated shape corresponding to the product cavity, based on application requirements. Consequently, the thermoformed packages formed from the thermoformable sheets and having the complicated shapes may be free of defects, such as cracks, color inhomogeneity, and out-of-register prints. Moreover, the thermoformable sheets of the present disclosure may be recyclable, as opposed to conventional thermoformable sheets which may contaminate the recycling streams. The thermoformable sheets and the thermoformed packages of the present disclosure may therefore be environmentally friendly and may promote environmental sustainability.

There are several aspects of the present subject matter which may be embodied separately or together. These aspects may be employed alone or in combination with other aspects of the subject matter described herein, and the description of these aspects together is not intended to preclude the use of these aspects separately or the claiming of such aspects separately or in different combinations.

BRIEF DESCRIPTION OF THE DRAWINGS

The disclosure may be more completely understood in consideration of the following detailed description of various embodiments of the disclosure in connection with the accompanying drawings, in which.

The figures are not necessarily to scale. Like numbers used in the figures refer to like components. It will be understood, however, that the use of a number to refer to a component in a given figure is not intended to limit the component in another figure labeled with the same number.

DETAILED DESCRIPTION

The present application describes a recyclable thermoformable sheet including an exterior film. The exterior film includes between 50% and 100% polyolefin-based polymers, by weight. The thermoformable sheet further includes a printed pigment layer, an adhesive layer, an inner layer, and an interior sealing layer. The inner layer includes between 60% and 100% of high-density polyethylene polymer, by weight. The inner layer further includes a thickness between 100 microns and 350 microns. The printed pigment layer and the adhesive layer are located between the exterior film and the inner layer.

The inner layer may impart a desired thermoformability to the thermoformable sheet. In other words, the inner layer may allow thermoforming of the thermoformable sheet into difficult and challenging shapes. In some cases, the inner layer may further impart ultraviolet barrier properties to the thermoformable sheet. Further, the inner layer including between 60% and 100% of high-density polyethylene polymer, by weight, may ensure that the thermoformable sheet is recyclable.

The exterior film may provide a substrate for reverse printing. The printed pigment layer may be deposited directly on the exterior film. The printed pigment layer may be deposited on either or both of the major surfaces of the exterior film. Moreover, the exterior film may help in achieving the desired thermoformability of the thermoformable sheet.

In some cases, the adhesive layer may include a recyclable adhesive, such as a plastomer adhesive. Consequently, the thermoformable sheet may be easier to recycle, as ethylene-vinyl acetate (EVA), which is typically used for adhesion, is considered as a contaminant in recycling streams.

The interior sealing layer may provide desired functionalities and properties to the thermoformable sheet, such as, peelability, barrier properties, seal initiation temperature, coefficient of friction requirements, etc. Furthermore, the interior sealing layer may allow the thermoformable sheet to be folded over on itself, and to be sealed by bonding the interior sealing layer to itself.

The thermoformable sheet may be thermoformed into complicated shapes. Consequently, thermoformed package formed by the thermoformable sheet and having the complicated shape may be free of defects, such as cracks, color inhomogeneity, and out-of-register prints. Moreover, the thermoformable sheet of the present disclosure may be recyclable as opposed to conventional thermoformable sheets which may contaminate the recycling streams. The thermoformable sheet and the thermoformed package may therefore be environmentally friendly and may promote environmental sustainability.

As used herein, the terms "first" and "second" are used as identifiers. Therefore, such terms should not be construed as limiting of this disclosure. The terms "first" and "second"

when used in conjunction with a feature or an element can be interchanged throughout the embodiments of this disclosure.

As used herein, the term "film" is a material with a very high ratio of length or width to thickness. A film has two major surfaces defined by a length and width. Films typically have good flexibility and can be used for a wide variety of applications, including flexible packaging. Films may also be of thickness and/or material composition such that they are flexible, semi-rigid, or rigid. Films may be described as monolayer or multilayer.

As used herein, the term "layer" refers to a thickness of material within a film that has a relatively consistent formula (i.e., a layer is homogeneous). Layers may be of any type of material including polymeric, cellulosic, and metallic, or a blend thereof. A given polymeric layer may consist of a single polymer-type or a blend of polymers and may be accompanied by additives. A given layer may be combined or connected to other layers to form films. A layer may be either partially or fully continuous as compared to adjacent layers or the film. A given layer may be partially or fully coextensive with adjacent layers. A layer may contain sublayers.

As used herein, the terms "interior" and "exterior" refer to the major surfaces of a film or a layer, and to the location in reference to the use of the film or the layer in a package configuration. Interior films or layers may comprise an innermost major surface in the package configuration. Exterior films or layers may comprise an outermost major surface in the package configuration.

As used herein, the term "inner layer" refers to a layer of a film structure that does not reside on either major exterior surface of the film. An inner layer may consist of a single layer or may be multi-layered. There may be one or more inner layers in a film.

As used herein, the term "thermoformable" refers to a sheet capable of being formed or thermoformed into a desired shape by the application of a differential pressure between the sheet and a mold, by the application of heat, by the combination of the application of heat and a differential pressure between the sheet and a mold, or by any suitable thermoforming technique. The term "thermoformability" refers to an ability of the sheet to formed or thermoformed into the desired shape and subsequently retain the desired shape.

As used herein, the term "adhesive layer" refers to a layer which has a primary function of bonding two adjacent layers together. The adhesive layers may be positioned between two layers of a multilayer film to maintain the two layers in position relative to each other and prevent undesirable delamination. Unless otherwise indicated, an adhesive layer can have any suitable composition that provides a desired level of adhesion with the one or more surfaces in contact with the adhesive layer material.

As used herein, the term "sealing layer" refers to a layer of a film, sheet, etc., involved in the sealing of the film, sheet, etc., to itself and/or to another layer of the same or another film, sheet, etc.

As used herein, the term "barrier" refers to any material which controls a permeable element of a film, sheet, web, package, etc., against aggressive agents, and includes but is not limited to, oxygen barrier, moisture (e.g., water, humidity, etc.) barrier, chemical barrier, heat barrier, light barrier, and odor barrier. The term "barrier layer" refers to a layer of the film, sheet, web, package, etc., which controls such permeable element.

As used herein, the terms "heat seal", "heat sealed", "heat sealing", "heat sealable", and the like, refer to both a film layer which is heat sealable to itself or other thermoplastic film layer, and the formation of a fusion bond between two polymer surfaces by conventional indirect heating means. It will be appreciated that conventional indirect heating generates sufficient heat on at least one film contact surface for conduction to the contiguous film contact surface such that the formation of a bond interface therebetween is achieved without loss of the film integrity.

As used herein, the term "plastomer" refers to a polymer which combines qualities of elastomers and plastics, such as rubber-like properties with the processing ability of plastics. One example of plastomers includes ethylene-alpha olefin copolymers.

As used herein, the terms "polyolefin" and "polyolefin-based polymers" refer to polyethylene homopolymers, polyethylene copolymers, polypropylene homopolymers, or polypropylene copolymers.

As used herein, the term "polyethylene-based polymers" refers to polymers that include an ethylene linkage. Polyethylenes may be homopolymers, copolymers, or interpolymers. Polyethylene copolymers or interpolymers may include other types of polymers (i.e., non-polyethylene polymers). Polyethylenes may have functional groups incorporated by grafting or other means. Polyethylenes include, but are not limited to, low-density polyethylene (LDPE), linear low density polyethylene (LLDPE), medium-density polyethylene (MDPE), ultra-low density polyethylene (ULDPE), high-density polyethylene (HDPE), cyclic-olefin copolymers (COC), ethylene vinyl acetate copolymers (EVA), ethylene acrylic acid copolymers (EAA), ethylene methacrylic acid copolymers (EMAA), neutralized ethylene copolymers such as ionomer, and maleic anhydride grafted polyethylene (MAHgPE).

As used herein, the term "polypropylene-based polymers" refers to polymers that are derived from monomers of propylene. Polypropylenes may be homopolymers, copolymers, or interpolymers. Polypropylene copolymers or interpolymers may include other types of polymers (i.e., non-polypropylene polymers). Propylene linkage can be represented by the general formula: $[CH_2-CH(CH_3)]_n$. Polypropylenes may have functional groups incorporated by grafting or other means. Polypropylenes include, but are not limited to, propylene-ethylene copolymers, ethylene-propylene copolymers, and maleic anhydride grafted polypropylenes (MAHgPP).

As used herein, the terms "high density polyethylene" and "HDPE" refer to homopolymers of ethylene that have densities of about 0.945 g/cm$^3$ to about 0.975 g/cm$^3$ as well as copolymers of ethylene and an alpha-olefin (such as 1-butene or 1-hexene) that have densities of about 0.940 g/cm$^3$ to about 0.958 g/cm$^3$. HDPE is inclusive of polymers made with Ziegler or Phillips type catalysts and polymers made with single-site metallocene catalysts. HDPE also refers to high molecular weight polyethylenes. Pre-nucleated grades of HDPE are suitable for the inner layer. Examples of pre-nucleated high-density polyethylene materials that may be suitable for the inner layer are Grade M6020SB available from Equistar and HPS167AB available from Nova Chemicals. In some embodiments, HDPE used may have a melting point, as measured by differential scanning calorimetry, between 125° C. and 140° C., preferably between 130° C. and 135° C. The melt-index (190° C./2.16 kg) of the HDPE may be between 0.4-1.5 g/10 min. The HDPE polymer distribution may be unimodal, bimodal or multimodal with Mw/Mn that ranges from 5-25 for both unimodal and multimodal grades. Bimodal HDPE may have an Mw/Mn between 1.5-3.5 for the first peak and between 1.2-2.5 for the second peak. Mw/Mn are determined by GPC-triple detection. Examples of such grades are LyondellBasell GF9055 and Dow Elite 5960G.

As used herein, the terms "ethylene/vinyl alcohol copolymer" and "EVOH" both refer to polymerized ethylene vinyl alcohol. Ethylene/vinyl alcohol copolymers include saponified (or hydrolyzed) ethylene/vinyl acrylate copolymers and refer to a vinyl alcohol copolymer having an ethylene comonomer prepared by, for example, hydrolysis of vinyl acrylate copolymers or by chemical reactions with vinyl alcohol. The degree of hydrolysis is, preferably, at least 50% and, more preferably, at least 85%. Preferably, ethylene/vinyl alcohol copolymers comprise from about 28-48 mole % ethylene, more preferably, from about 32-44 mole % ethylene, and, even more preferably, from about 38-44 mole % ethylene.

As used herein, the term "hydrocarbon resin" refers to a low molecular weight product (molecular weight less than about 10,000 Daltons) produced by polymerization from coal tar, petroleum, and turpentine feed stocks. A hydrocarbon resin may comprise any of those hydrocarbon resins disclosed in U.S. Pat. No. 6,432,496, issued Aug. 13, 2002, or in U.S. Patent Application 2008/0286547, published Nov. 20, 2008, both of which are incorporated in their entireties in this application by this reference. More specifically, as a non-limiting example, the hydrocarbon resin may include petroleum resins, terpene resins, styrene resins, cyclopentadiene resins, saturated alicyclic resins or mixtures of such resins. Additionally, as a non-limiting example, the hydrocarbon resin may comprise hydrocarbon resin derived from the polymerization of olefin feeds rich in dicyclopentadiene (DCPD), from the polymerization of olefin feeds produced in the petroleum cracking process (such as crude C9 feed streams), from the polymerization of pure monomers (such as styrene, α-methylstyrene, 4-methylstyrene, vinyltoluene or any combination of these or similar pure monomer feedstocks), from the polymerization of terpene olefins (such as α-pinene, β-pinene or d-limonene), or from a combination of such. The hydrocarbon resin may be fully or partially hydrogenated. Specific examples of hydrocarbon resins include but are not limited to Plastolyn® R1140 Hydrocarbon Resin available from Eastman Chemical Company (Kingsport, Tenn.), Regalite® T1140 available from Eastman Chemical Company (Kingsport, Tenn.), Arkon® P-140 available from Arakawa Chemical Industries, Limited (Osaka, Japan) and Piccolyte® S135 Polyterpene Resins available from Hercules Incorporated (Wilmington, Del.).

As used herein, the term "polystyrene" refers to a homopolymer or copolymer having at least one styrene monomer linkage (such as benzene (i.e., $C_6H_5$) having an ethylene substituent) within the repeating backbone of the polymer. The styrene linkage can be represented by the general formula: $[CH_2-CH_2(C_6H_5)]_n$.

As used herein, the term "oriented" refers to a monolayer or multilayer film, sheet, or web which has been elongated in at least one of a machine direction or a transverse direction. Non-limiting examples of such procedures include the single bubble blown film extrusion process and the slot case sheet extrusion process with subsequent stretching, for example, by tentering, to provide orientation. Another example of such procedure is the trapped bubble or double bubble process. (See, for example, U.S. Pat. Nos. 3,546,044 and 6,511,688, each of which is incorporated in its entirety in this application by this reference.) In the trapped bubble or double bubble process, an extruded primary tube leaving the tubular extrusion die is cooled, collapsed, and then oriented by reheating, reinflating to form a secondary bubble and recooling. Transverse direction orientation may be accomplished by inflation, radially expanding the heated film tube. Machine direction orientation may be accomplished by the use of nip rolls rotating at different speeds, pulling, or drawing the film tube in the machine direction. The combination of elongation at elevated temperature followed by cooling causes an alignment of the polymer chains to a more parallel configuration, thereby improving the mechanical properties of the film, sheet, web, package, or otherwise. Upon subsequent heating of an unrestrained, unannealed, oriented article to its orientation temperature, heat-shrinkage (as measured in accordance with American Society for Testing and Materials (ASTM) Test Method D2732, "Standard Test Method for Unrestrained Linear Thermal Shrinkage of Plastic Film and Sheeting," which is incorporated in its entirety in this application by this reference) may be produced. Heat-shrinkage may be reduced if the oriented article is annealed or heat-set by heating to an elevated temperature, preferably to an elevated temperature which is above the glass transition temperature and below the crystalline melting point of the polymer comprising the article. This reheating/annealing/heat-setting step also provides a polymeric web of uniform flat width. The polymeric web may be annealed (i.e., heated to an elevated temperature) either in-line with (and subsequent to) or off-line from (in a separate process) the orientation process.

As used herein, the terms "unoriented" and "non-oriented" refer to a monolayer or multilayer film, sheet or web that is substantially free of post-extrusion orientation.

As used herein, the term "directly adjacent" identifies two layers of a film that share an interface, i.e., two layers of the film that contact each other such that a surface forms a common boundary between the two layers.

As used herein, the term "oxygen transmission rate" (OTR) is defined as an amount of oxygen that will pass through a material in a given time period. OTR is typically defined using units of $cm^3/m^2 \cdot day$, or similar units, when measured at a defined temperature and humidity.

As used herein, the term "water vapor transmission rate" (WVTR) is defined as a steady state rate at which water vapor permeates through a film at specified conditions of temperature and relative humidity. WVTR is typically defined using units of $g/m^2 \cdot day$, or similar units, when measured at a defined temperature and humidity.

Figure 1:
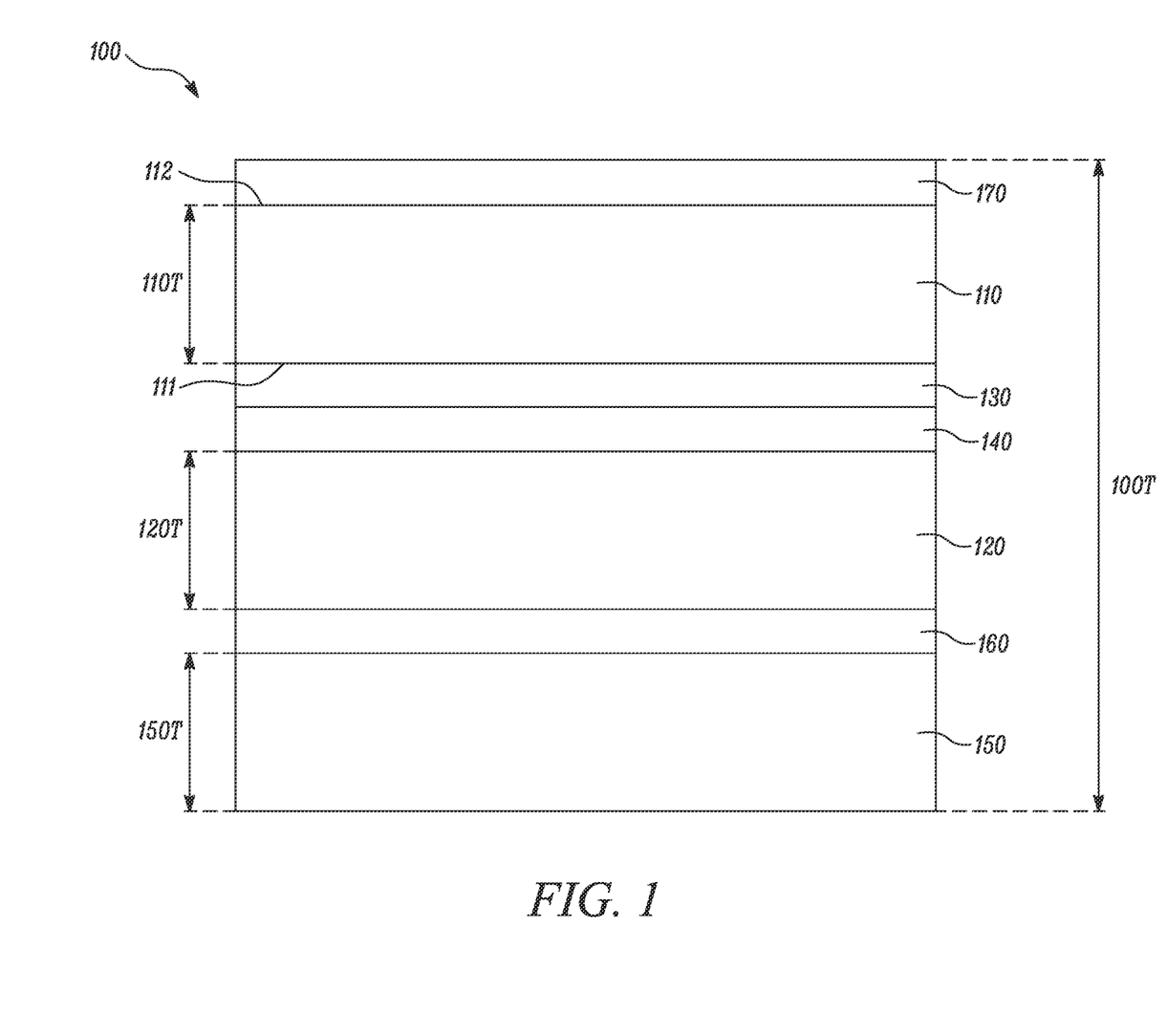
FIG. 1 is a schematic cross-sectional view of a thermoformable sheet in accordance with an embodiment of the present disclosure.

FIG. 1 illustrates a schematic cross-sectional view of a thermoformable sheet 100 in accordance with an embodiment of the present disclosure.

Thermoformable sheet 100 includes an exterior film 110. Exterior film 110 includes between 50% and 100% polyolefin-based polymers, by weight. In some embodiments, exterior film 110 includes between 80% and 100% polyolefin-based polymers, by weight. In some embodiments, exterior film 110 includes between 90% and 100% polyolefin-based polymers, by weight. In some embodiments, exterior film 110 includes between 95% and 100% polyolefin-based polymers, by weight.

Specifically, in some embodiments, exterior film 110 includes between 50% and 100% polyethylene-based polymers, by weight. In some embodiments, exterior film 110 includes between 80% and 100% polyethylene-based polymers, by weight. In some embodiments, exterior film 110 includes between 90% and 100% polyethylene-based polymers, by weight. In some embodiments, exterior film 110 includes between 95% and 100% polyethylene-based polymers, by weight.

In some other embodiments, exterior film 110 includes between 50% and 100% polypropylene-based polymers, by weight. In some embodiments, exterior film 110 includes between 80% and 100% polypropylene-based polymers, by weight. In some embodiments, exterior film 110 includes between 90% and 100% polypropylene-based polymers, by weight. In some embodiments, exterior film 110 includes between 95% and 100% polypropylene-based polymers, by weight.

Exterior film 110 further includes a thickness 110T. In some embodiments, thickness 110T is between 6 microns and 50 microns. In some embodiments, thickness 110T is between 12 microns and 50 microns. In some embodiments, thickness 110T is between 20 microns and 40 microns. In some embodiments, thickness 110T is about 25 microns, about 30 microns, or about 35 microns.

Exterior film 110 may be unoriented or oriented, based upon application requirements. In some embodiments, exterior film 110 is oriented. In some embodiments, exterior film 110 includes an oriented polyethylene-based film including thickness 110T between 6 microns and 50 microns.

Exterior film 110 may be oriented in either one direction ("uniaxial") or two directions ("biaxial"). In some embodiments, exterior film 110 may be a biaxially oriented polyethylene (BOPE) film. In some embodiments, exterior film 110 may be a biaxially oriented polypropylene (BOPP) film. In some embodiments, exterior film 110 may be a machine direction orientation polyethylene (MDOPE) film. In some embodiments, exterior film 110 may be a machine direction orientation polypropylene (MDOPP) film.

In some other embodiments, exterior film 110 is unoriented. In other words, in some other embodiments, exterior film 110 is non-oriented.

Thermoformable sheet 100 further includes an inner layer 120. In some embodiments, inner layer 120 is unoriented. In other words, in some embodiments, inner layer 120 is non-oriented.

Inner layer 120 includes between 60% and 100% of high-density polyethylene (HDPE) polymer, by weight. In some embodiments, inner layer 120 includes between 70% and 100% of high-density polyethylene polymer, by weight. In some embodiments, inner layer 120 includes between 80% and 100% of high-density polyethylene polymer, by weight.

In some embodiments, inner layer 120 further includes between 2.5% and 30% of a hydrocarbon resin, by weight. Examples of the hydrocarbon resin may include petroleum resins, terpene resins, styrene resins, cyclopentadiene resins, saturated alicyclic resins, or mixtures of such resins. Other examples of the hydrocarbon resin may include hydrocarbon resin derived from the polymerization of olefin feeds rich in dicyclopentadiene (DCPD), from the polymerization of olefin feeds produced in the petroleum cracking process (such as crude C9 feed streams), from the polymerization of pure monomers (such as styrene, α-methylstyrene, 4-methylstyrene, vinyltoluene or any combination of these or similar pure monomer feedstocks), from the polymerization of terpene olefins (such as α-pinene, β-pinene or d-limonene), or from a combination of such.

The hydrocarbon resin may be loaded into inner layer 120 at a level between 2.5% and 30%. Some embodiments of thermoformable sheet 100 will have hydrocarbon resin levels in inner layer 120 between 5% and 20%. In exemplary embodiments, the hydrocarbon resin is present at an amount of about 15% or about 7.5%, by weight. The level of hydrocarbon resin may be adjusted to control both the moisture barrier properties of thermoformable sheet 100 and the thermoforming temperature window. Increasing the hydrocarbon resin level may increase the moisture barrier properties of thermoformable sheet 100. Increasing the hydrocarbon resin level may increase the thermoforming temperature window of thermoformable sheet 100.

In some embodiments, inner layer 120 may be substantially transparent or white in color. In some embodiments, inner layer 120 may have three portions having different colors. For example, two outer portions of inner layer 120 may be white in color, and a middle portion of inner layer 120 located between the two outer portions may be black in color. Such a configuration (white/black/white) of inner layer 120 may impart ultraviolet barrier properties to thermoformable sheet 100.

In some embodiments, inner layer 120 may include calcium carbonate ($CaCO_3$) or titanium dioxide ($TiO2$). In some embodiments, two layers of calcium carbonate may be added to inner layer 120. Addition of calcium carbonate to inner layer 120 may facilitate cutting of inner layer 120. Further, inner layer 120 may be produced on cast film lines or blown film lines. Inner layer 120 may be produced as a collapsed bubble on the blown film lines.

Inner layer 120 further includes a thickness 120T. Thickness 120T is between 100 microns and 350 microns. In some embodiments, thickness 120T is between 180 microns and 275 microns. In some embodiments, thickness 120T is between 180 microns and 240 microns. In some embodiments, thickness 120T is between 200 microns and 240 microns.

Inner layer 120 may impart a desired thermoformability to thermoformable sheet 100. In other words, inner layer 120 may allow thermoforming of thermoformable sheet 100 into difficult and challenging shapes. Therefore, thermoformable sheet 100 may be thermoformed into the difficult and challenging shapes. As discussed above, in some cases, inner layer 120 may further impart ultraviolet barrier properties to thermoformable sheet 100.

Thermoformable sheet 100 further includes a printed pigment layer 130. Printed pigment layer 130 may be formed by any suitable printing process, such as offset printing, flexography, rotogravure, digital printing process, and the like. In some embodiments, printed pigment layer 130 is directly adjacent to exterior film 110. In some embodiments, printed pigment layer 130 is deposited directly on a surface 111 of exterior film 110. Surface 111 may be a major surface of exterior film 110 facing inner layer 120. In some cases, printed pigment layer 130 may be reverse printed on surface 111 of exterior film 110. Printed pigment layer 130 may be continuous with the other layers/film or may be discontinuous (i.e., patterned).

Printed pigment layer 130 may include any suitable ink compositions, such as dryable and/or curable solvent-containing inks, water-based or solvent-less inks including one or more polymer(s) and/or oligomers selected from the group consisting of polyolefins, poly(meth)acrylics, styrene-(meth)acrylic copolymers, polyesters, polyamides, polyvinyl chloride, latex, polycarbonates, polyurethanes, polyethers, alkyd resins, rosin resins, maleic resins, hydrocarbon resins, nitrocellulose, polyvinyl butyral, and mixtures thereof, and one or more dyes and/or pigments.

Thermoformable sheet 100 further includes an adhesive layer 140. Adhesive layer 140 may include any suitable adhesive, based on application requirements. For example, adhesive layer 140 may include an adhesive selected from the group consisting of polyurethane dispersions, acrylic emulsions, water-based polyvinyl alcohol, vinyl acetate copolymers, modified polyolefins, polyesters, synthetic or natural rubber, solvent-based acrylics, one or two component solvent-based polyurethanes, and radiation-curable adhesives. In some embodiments, adhesive layer 140 may include a solvent-based polyurethane adhesive. However, adhesive layer 140 preferably includes a recyclable adhesive (e.g., an adhesive including a plastomer) to improve recyclability of thermoformable sheet 100. In other words, thermoformable sheet 100 including adhesive layer 140 including the plastomers may be recyclable, as ethylene-vinyl acetate (EVA), which is typically used for adhesion, may contaminate the recycling streams.

Printed pigment layer 130 and adhesive layer 140 are located between exterior film 110 and inner layer 120. In other words, printed pigment layer 130 and adhesive layer 140 are disposed between exterior film 110 and inner layer 120. In the illustrated embodiment of FIG. 1, printed pigment layer 130 is located between exterior film 110 and adhesive layer 140. Further, in the illustrated embodiment of FIG. 1, adhesive layer 140 is located between printed pigment layer 130 and inner layer 120.

Thermoformable sheet 100 further includes an interior sealing layer 150. In some embodiments, interior sealing layer 150 includes a polyethylene polymer. In some embodiments, interior sealing layer 150 includes polyethylene-based polymers. Examples of the polyethylene-based polymers include polyethylene, low density polyethylene (LDPE), linear low density polyethylene (LLDPE), very low density polyethylene (VLDPE), ultra-low density polyethylene (ULDPE), medium density polyethylene (MDPE), high density polyethylene (HDPE), ethylene/propylene copolymers, ethylene/vinyl acetate copolymers, ethylene/methyl acrylate copolymers, and the like.

In some other embodiments, interior sealing layer 150 includes polypropylene-based polymers. Examples of the polypropylene-based polymers include polypropylene random copolymer (PPR or PP-R), polypropylene terpolymer, heterophasic propylene copolymer, rubber modified polypropylene copolymer, and the like.

Interior sealing layer 150 further includes a thickness 150T. In some embodiments, thickness 150T is between 30 microns and 80 microns. In some embodiments, thickness 150T is between 40 microns and 60 microns. In some embodiments, thickness 150T is about 45 microns.

Interior sealing layer 150 may provide desired functionalities and properties to thermoformable sheet 100. For example, interior sealing layer 150 may provide desired peelability or sealing properties. In another example, interior sealing layer 150 may provide desirable barrier properties or non-barrier properties. In yet another example, interior sealing layer 150 may provide a desired seal initiation temperature (SIT) and a desired coefficient of friction (COF), based on application requirements. For example, in some embodiments, interior sealing layer 150 may have a low seal initiation temperature of about 130 degrees Celsius (° C.). Further, interior sealing layer 150 may allow thermoformable sheet 100 to be folded over on itself, and to be sealed by bonding interior sealing layer 150 to itself.

In the illustrated embodiment of FIG. 1, thermoformable sheet 100 further includes a barrier layer 160. Further, in the illustrated embodiment of FIG. 1, barrier layer 160 is located between inner layer 120 and interior sealing layer 150. However, in some embodiments, barrier layer 160 may be incorporated into (i.e., may be a sublayer of) interior sealing layer 150. In other words, in some embodiments, interior sealing layer 150 may include barrier layer 160.

In some embodiments, barrier layer 160 includes ethylene vinyl alcohol (EVOH) copolymer. In some embodiments, barrier layer 160 may include polyvinylidene dichloride (PVDC) or polyvinyl alcohol (PVOH). In some embodiments, barrier layer 160 may have a low oxygen transmission rate (OTR). In other words, in some embodiments, barrier layer 160 may reduce or prevent transmission of oxygen through thermoformable sheet 100. In some embodiments, barrier layer 160 may have a low water vapor transmission rate (WVTR). In other words, in some embodiments, barrier layer 160 may reduce or prevent transmission of water vapor through thermoformable sheet 100. However, barrier layer 160 is optional. That is, in some embodiments, thermoformable sheet 100 may not include barrier layer 160. In such embodiments, where barrier layer 160 is omitted, interior sealing layer 150 may be adjacent to inner layer 120. In some embodiments, thermoformable sheet 100 may further include one or more adhesive layers (not shown) located between inner layer 120 and interior sealing layer 150 to facilitate bonding between inner layer 120, interior sealing layer 150, and, optionally, barrier layer 160.

In the illustrated embodiment of FIG. 1, thermoformable sheet 100 further includes an outermost layer 170. Outermost layer 170 may be disposed adjacent to exterior film 110. Specifically, in the illustrated embodiment of FIG. 1, outermost layer 170 is disposed on a surface 112 of exterior film 110. Surface 112 may be a major surface of exterior film 110 facing opposite to inner layer 120. In other words, surface 112 may be opposite to surface 111. In some embodiments, outermost layer 170 may be deposited directly on surface 112 of the exterior film 110.

In some embodiments, outermost layer 170 may include an over-lacquer layer. The over-lacquer layer may include, for example, nitrocellulose materials, nitrocellulose materials mixed with an anti-blocking agent such as silica, and water-based acrylic resins, and the like. The over-lacquer layer may be applied in a liquid state by using an appropriate solvent, such as water in the case of water-based acrylic resins. The over-lacquer layer may protect exterior film 110 and may improve an appearance of surface 112 of exterior film 110.

In some other embodiments, outermost layer 170 may include a printed pigment layer similar to printed pigment layer 130 described above. In some embodiments, outermost layer 170 may be multi-layered and include the printed pigment layer deposited directly on surface 112 of the exterior film 110 and the over-lacquer deposited directly on the printed pigment layer. In such embodiments, the over-lacquer layer may protect the printed pigment layer and may improve the appearance of surface 112 of exterior film 110. However, outermost layer 170 is optional. That is, in some embodiments, thermoformable sheet 100 may not include outermost layer 170. In such embodiments, where outermost layer 170 is omitted, surface 112 of exterior film 110 may be exposed to an external environment. Outermost layer 170 and the printed pigment layer(s) may be continuous with the other layers/film or may be discontinuous (i.e., patterned).

In some embodiments, thermoformable sheet 100 includes an overall composition of polyolefin of between 80% and 100%, by weight. In some embodiments, thermoformable sheet 100 includes an overall composition of polyolefin of between 90% and 99%, by weight. Furthermore, in some embodiments, thermoformable sheet 100 includes an overall composition of EVOH copolymer of less than or equal to about 5%, by weight.

In some embodiments, thermoformable sheet 100 includes an overall composition of polyethylene of between 80% and 100%, by weight. In some embodiments, thermoformable sheet 100 includes an overall composition of polyethylene of between 90% and 99%, by weight.

Thermoformable sheet 100 further includes a thickness 100T. Thickness 100T may be an overall thickness of thermoformable sheet 100. In other words, thickness 100T may be a sum of thicknesses of all layers and films of thermoformable sheet 100. In some embodiments, thickness 100T is between 200 microns and 500 microns. In some embodiments, thickness 100T is between 225 microns and 350 microns.

Thermoformable sheet 100 may have a desired thermoformability and therefore may be thermoformed into complicated shapes. Advantageously, thermoformable sheet 100 may be thermoformed into packages having complicated shapes and designs to store and contain one or more products. The one or more products contained in the packages formed by thermoformable sheet 100 may have an improved shelf-life. Moreover, thermoformable sheet 100 may be recyclable as compared to conventional thermoformable sheets which may contaminate the recycling streams. Thermoformable sheet 100 may therefore be environmentally friendly and may promote environmental sustainability.

Figure 2A:
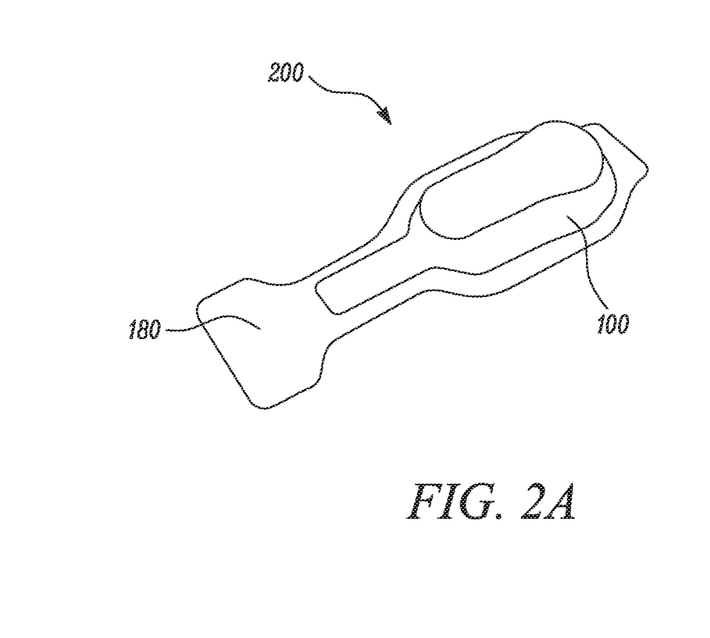
FIG. 2A is a schematic top perspective view of a package in accordance with an embodiment of the present disclosure.
Figure 2B:
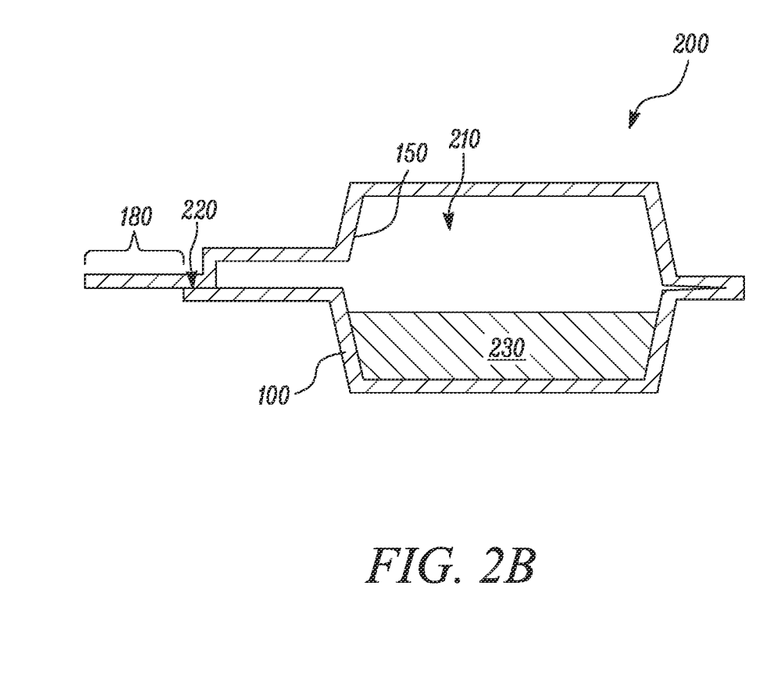
FIG. 2B is a schematic cross-sectional side view of the package of FIG. 2A in accordance with an embodiment of the present disclosure.

FIGS. 2A and 2B illustrate a thermoformed package 200 in accordance with an embodiment of the present disclosure. Specifically, FIG. 2A illustrates a schematic top perspective view of package 200, and FIG. 2B illustrates a schematic cross-sectional side view of package 200.

Referring to FIGS. 2A and 2B, package 200 includes thermoformable sheet 100 of FIG. 1. Thermoformable sheet 100 is thermoformed to create a product cavity 210. In other words, package 200 is made by thermoforming thermoformable sheet 100 of FIG. 1 by a suitable thermoforming process, such as positive mold thermoforming, negative mold thermoforming, and the like, to create product cavity 210. As shown in FIG. 2A, package 200 including product cavity 210 has a complicated curved form, and a sharp-edged shape, which may present challenging demands on the thermoformability of thermoformable sheet 100. As discussed above, thermoformable sheet 100 may have the desired thermoformability to be thermoformed into the complicated curved form and the sharp-edged shape of package 200.

As illustrated embodiment in FIG. 2B, package 200 consists of thermoformable sheet 100 folded over on itself and a seal 220 formed by bonding interior sealing layer 150 (shown in greater detail in FIG. 1) of thermoformable sheet 100 to itself. Seal 220 may be a heat seal. As discussed above, interior sealing layer 150 may have a low seal initiation temperature of about 130° C. Therefore, seal 220 may be formed at a temperature of about 130° C.

Package 200 contains a product 230. Product 230 is contained within product cavity 210. Package 200 may be a single-serve portion pack to pack food-on-the-go. Product 230 may be, for example, food including dry, liquid, or pasty foodstuffs, such as soups, powdered drinks, cocoa, nuts, snack foods, cereals, candy, cheese, yogurt, dips, jam, and ketchup. In other examples, product 230 may be home/garden products, and medical devices/products. In some embodiments, product 230 is hermetically sealed inside product cavity 210. In other words, in some embodiments, seal 220 may hermetically seal product 230 inside product cavity 210.

In some embodiments, thermoformable sheet 100 further includes at least one tab 180 located in a position such that seal 220 is between at least one tab 180 and product cavity 210. At least one tab 180 may be an extending portion of thermoformable sheet 100 extending beyond seal 220. The extending portion may be defined when thermoformable sheet 100 is folded over on itself. In some embodiments, package 200 can be opened manually by pulling on at least one tab 180 and peeling seal 220. At least one tab 180 may therefore facilitate opening of package 200.

Figure 2C:
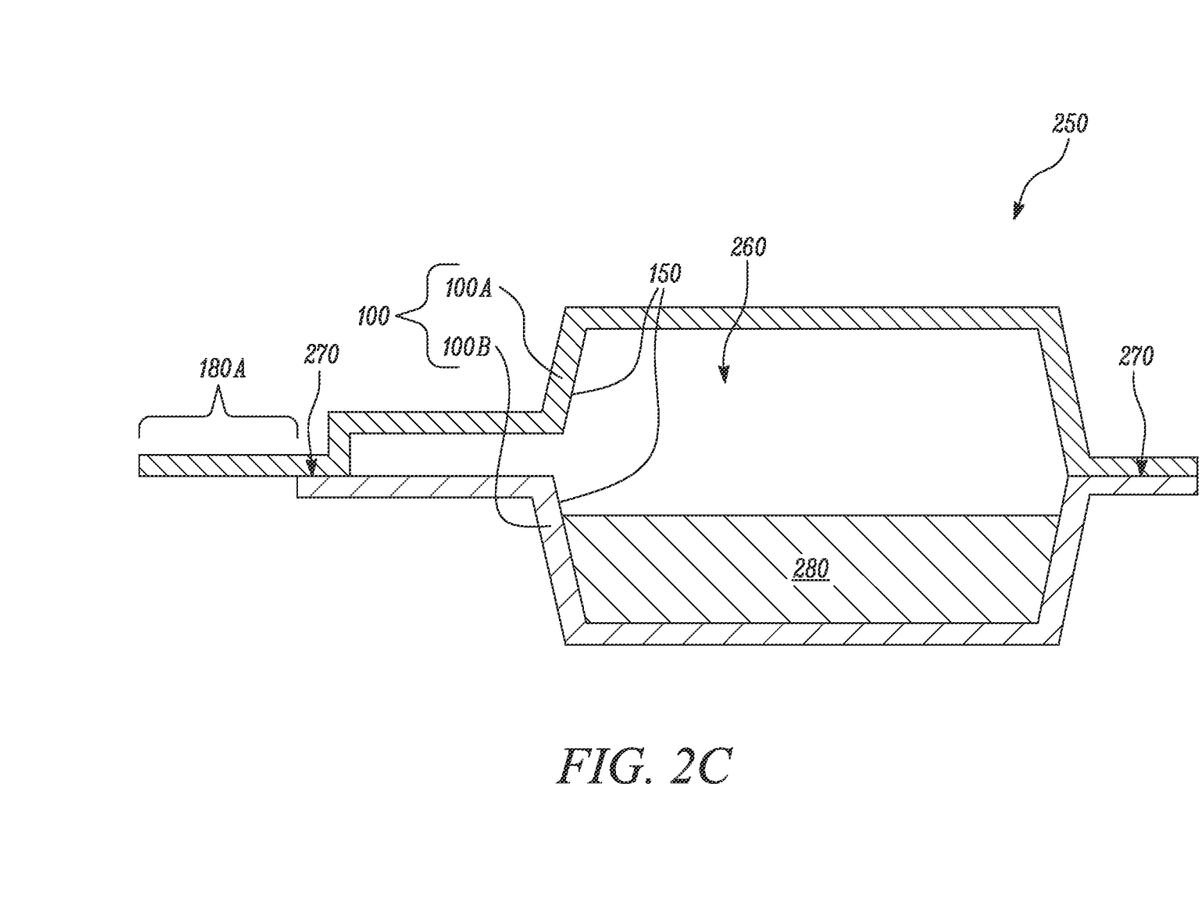
FIG. 2C is a schematic cross-sectional side view of a package in accordance with another embodiment of the present disclosure.

FIG. 2C illustrates a schematic cross-sectional side view of a thermoformed package 250 in accordance with another embodiment of the present disclosure.

Package 250 includes thermoformable sheet 100 of FIG. 1. Specifically, in the illustrated embodiment of FIG. 2C, thermoformable sheet 100 includes a first thermoformable sheet 100A and a second thermoformable sheet 100B. The terms "first" and "second" are used as identifiers. In other words, first thermoformable sheet 100A and second thermoformable sheet 100B are identical to thermoformable sheet 100.

Thermoformable sheet 100 is thermoformed to create a product cavity 260. Specifically, in the illustrated embodiment of FIG. 2C, each of first thermoformable sheet 100A and second thermoformable sheet 100B is thermoformed to create product cavity 260.

In the illustrated embodiment of FIG. 2C, package 250 consists of first and second thermoformable sheets 100A, 100B, a seal 270 bonding interior sealing layer 150 (shown in greater detail in FIG. 1) of first thermoformable sheet 100A to interior sealing layer 150 (shown in greater detail in FIG. 1) of second thermoformable sheet 100B, and product cavity 260 located between first and second thermoformable sheets 110A, 100B. First and second thermoformable sheets 110A, 100B may together define product cavity 260. Seal 270 may be a heat seal. As discussed above, interior sealing layer 150 may have a low seal initiation temperature of about 130° C. Therefore, seal 270 may be formed at a temperature of about 130° C.

Package 250 contains a product 280. Product 280 is contained within product cavity 260. Package 250 may be a single-serve portion pack to pack food-on-the-go. Product 280 may be, for example, food including dry, liquid, or pasty foodstuffs, such as soups, powdered drinks, cocoa, nuts, snack foods, cereals, candy, cheese, yogurt, dips, jam, and ketchup. In other examples, product 280 may be home/garden products, and medical devices/products. In some embodiments, product 280 is hermetically sealed inside product cavity 260. In other words, in some embodiments, seal 270 may hermetically seal product 280 inside product cavity 260.

In some embodiments, thermoformable sheet 100A further includes at least one tab 180A located in a position such that seal 270 is between at least one tab 180A and product cavity 260. At least one tab 180A may be an extending portion of first thermoformable sheet 100A extending beyond seal 270. In some embodiments, package 250 can be opened manually by pulling on at least one tab 180A and peeling seal 270. At least one tab 180A may therefore facilitate opening of package 250.

Figure 3A:
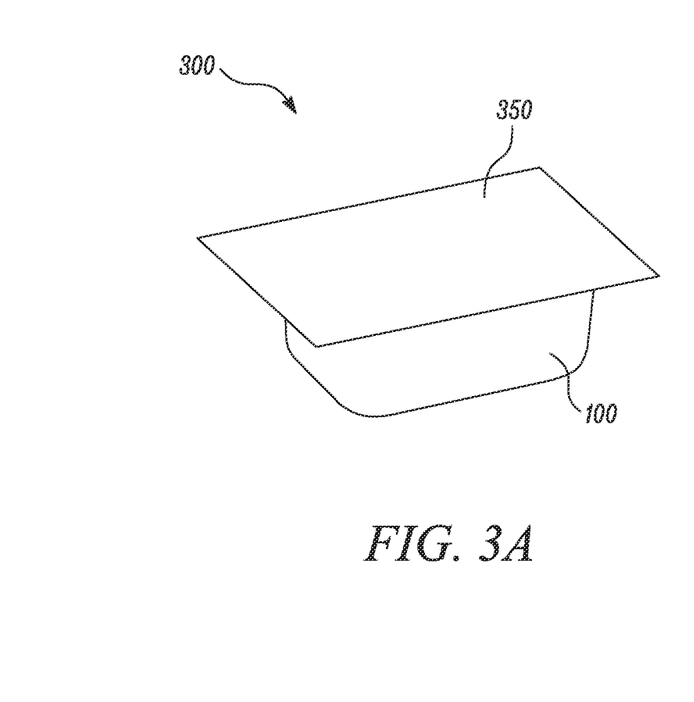
FIG. 3A is a schematic side perspective view of a package in accordance with an embodiment of the present disclosure.
Figure 3B:
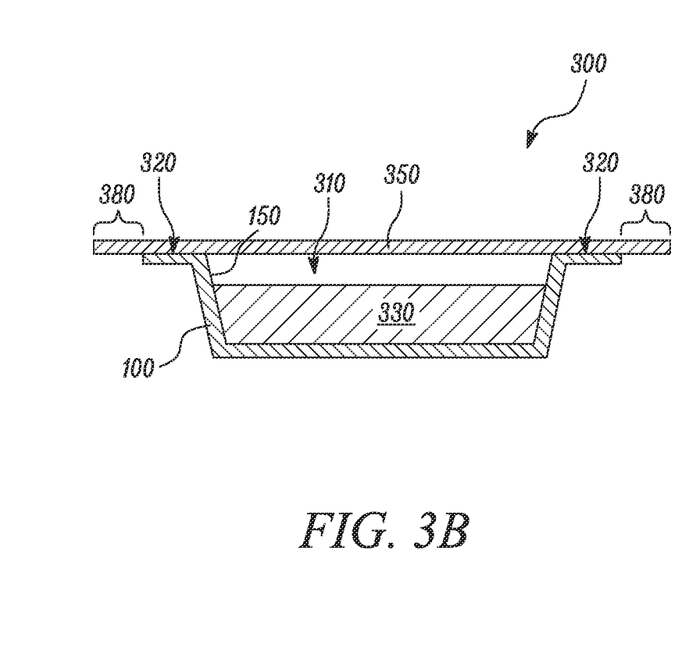
FIG. 3B is a schematic cross-sectional side view of the package of FIG. 3A in accordance with an embodiment of the present disclosure.

FIGS. 3A and 3B illustrate a thermoformed package 300 in accordance with an embodiment of the present disclosure. Specifically, FIG. 3A illustrates a schematic side perspective view of package 300, and FIG. 3B illustrates a schematic cross-sectional side view of package 300.

Package 300 includes thermoformable sheet 100 of FIG. 1. Thermoformable sheet 100 is thermoformed to create a product cavity 310. In other words, package 300 is made by thermoforming thermoformable sheet 100 of FIG. 1 by a suitable thermoforming process, such as positive mold thermoforming, negative mold thermoforming, and the like, to create product cavity 310.

In the illustrated embodiment of FIGS. 3A and 3B, thermoformable sheet 100 is thermoformed into a tray to create product cavity 310. Further, in the illustrated embodiment of FIGS. 3A and 3B, package 300 further includes a lidding material 350. Lidding material 350 may be in a form of a sheet/film. Lidding material 350 may include a polymeric film, lacquer, foil, paper, or any combination of the above. Lidding material 350 may further include, but is not limited to, HDPE, MDPE, LDPE, polyethylene, polypropylene, polyethylene terephthalate, polystyrene, polyvinyl chloride, polyamide, ethylene-vinyl acetate, thermoplastic olefin, or any combinations thereof. In some embodiments, lidding material 350 may include a thermoplastic sealing layer.

Referring to FIG. 3B, package 300 consists of thermoformable sheet 100 including product cavity 310, lidding material 350, and a seal 320 bonding interior sealing layer 150 (shown in greater detail in FIG. 1) of thermoformable sheet 100 to lidding material 350. Seal 320 may be a heat seal. As discussed above, interior sealing layer 150 may have a low seal initiation temperature of about 130° C. Therefore, seal 320 may be formed at a temperature of about 130° C.

Package 300 contains a product 330. Product 330 is contained within product cavity 310. Product 330 may be, for example, food including dry, liquid, or pasty foodstuffs, such as soups, powdered drinks, cocoa, nuts, snack foods, cereals, candy, cheese, yogurt, dips, jam, and ketchup. In other examples, product 330 may be home/garden products, and medical devices/products. In some embodiments, product 330 is hermetically sealed inside product cavity 310. In other words, in some embodiments, seal 320 may hermetically seal product 330 inside product cavity 310.

In some embodiments, lidding material 350 further includes at least one tab 380 located in a position such that seal 320 is between at least one tab 380 and product cavity 310. At least one tab 380 may be an extending portion of lidding material 350 extending beyond seal 220. In some embodiments, package 300 can be opened manually by pulling on at least one tab 380 and peeling seal 320. At least one tab 380 may therefore facilitate opening of package 300.

The following illustrative examples are merely meant to exemplify the present invention, but they are not intended to limit or otherwise define the scope of the present disclosure.

Example 1

Referring to FIG. 1, a first thermoformable sheet was produced with thickness 100T of 313 microns (μm). The first thermoformable sheet had a weight of 308.9 GSM (g/m$^2$).

The first thermoformable sheet included exterior film 110 including machine direction oriented polyethylene. Exterior film 110 had thickness 110T of 25 microns, and a weight of 24.1 g/m$^2$.

The first thermoformable sheet further included printed pigment layer 130 and adhesive layer 140. Printed pigment layer 130 included ink, and was reverse printed on exterior film 110, specifically on surface 111 of exterior film 110. Further, adhesive layer 140 had a thickness of 4 microns, and a weight of 4.5 g/m$^2$.

The first thermoformable sheet further included inner layer 120 including high-density polyethylene and 7.5% hydrocarbon. Inner layer 120 had thickness 120T of 240 microns and a weight of 237.8 g/m$^2$.

The first thermoformable sheet further included interior sealing layer 150 including polyethylene and ethylene vinyl alcohol (EVOH). Therefore, barrier layer 160 was incorporated into interior sealing layer 150. EVOH layer had a thickness of 4 microns. Further, interior sealing layer 150 had a total thickness of 40 microns, and a weight of 38.1 g/m$^2$.

The first thermoformable sheet further included an adhesive layer (not shown) disposed between inner layer 120 and interior sealing layer 150. The adhesive layer had a thickness of 4 microns and a weight of 4.5 g/m$^2$.

Composition, barrier properties, and seal properties of first thermoformable sheet are summarized in Tables 1 and 2 below.

TABLE 1

Composition and Barrier Properties for Example 1

| Properties | Unit | Value | Test Method |
|---|---|---|---|
| Composition | | | |
| Polyethylene | g/m$^2$ | 24.1 | ASTM D-4321 |
| Ink | g/m$^2$ | — | ASTM D-4321 |
| Adhesive | g/m$^2$ | 4.5 | ASTM D-4321 |
| Polyethylene | g/m$^2$ | 237.8 | ASTM D-4321 |
| Adhesive | g/m$^2$ | 4.5 | ASTM D-4321 |
| Polyethylene - EVOH - Peel | g/m$^2$ | 38.1 | ASTM D-4321 |
| Total Weight | g/m$^2$ | 308.9 | ASTM D-4321 |
| Total Thickness | μm | 313 | ASTM D-374 |
| Barrier Properties | | | |
| Water Vapor Transmission Rate (WVTR @ 38° C. & 90% RH) | g/m$^2$ · d | 0.4 | ASTM E-96 |
| Oxygen Transmission Rate (OTR @ 23° C. & 50% RH) | cm$^3$/m$^2$ · d · atm | 1 | ASTM D-3985 |

Referring to Table 1, the first thermoformable sheet had a water vapor transmission rate (WVTR) of 0.4 g/m$^2$·d at 38° C. & 90% relative humidity (RH). Further, the first thermoformable sheet had an oxygen transmission rate (OTR) of 1 cm$^3$/m$^2$·d·atm at 23° C. & 50% RH.

TABLE 2

Heat Sealing Properties for Example 1

| Seal Temperature (° C.) | MD Seal Strength (N/15 mm) | CD Seal Strength (N/15 mm) |
|---|---|---|
| 120 | 0 | 0 |
| 130 | 0 | 0 |
| 140 | 0.24 | 0.29 |
| 150 | 1.57 | 1.53 |
| 160 | 1.89 | 2.21 |
| 170 | 2.58 | 3.18 |
| 180 | 3.03 | 3.55 |

Referring to Table 2, the thermoformable sheet of Example 1 was tested for sealing properties according to ASTM F88. Heat seals were created between the interior sealing layers of two samples of Example 1 sheet. Heat seal conditions: two heated seal bars (top/bottom), time=1 second, pressure=400N/20 cm$^2$. Seal strength was testing using a pulling speed of 300 mm/min, in the direction indicated (MD-machine direction, CD=cross direction), across a cut sample having a width of 15 mm. Seal strength reported is the mean of three independent measurements. It was noted that at sealing temperatures of 170° C. and 180° C. slight sticking to the seal bar occurred.

Example 2

Referring to FIG. 1, a second thermoformable sheet was produced with thickness 100T of 273 microns. The second thermoformable sheet had a total weight of 269.7 g/m².

The second thermoformable sheet included exterior film 110 including machine direction oriented polyethylene. Exterior film 110 had thickness 110T of 25 microns, and a weight of 24.1 g/m².

The second thermoformable sheet further included printed pigment layer 130 and adhesive layer 140. Printed pigment layer 130 included ink, and was reverse printed on exterior film 110, specifically on surface 111 of exterior film 110. Adhesive layer 140 had a thickness of 4 microns and a weight of 4.5 g/m².

The second thermoformable sheet further included inner layer 120 including high-density polyethylene and 7.5% hydrocarbon. Inner layer 120 had thickness 120T of 200 microns and a weight of 198.6 g/m².

The second thermoformable sheet further included interior sealing layer 150 including polyethylene and ethylene vinyl alcohol (EVOH). Therefore, barrier layer 160 was incorporated into interior sealing layer 150. EVOH layer had a thickness of 4 microns. Further, interior sealing layer 150 had a total thickness of 40 microns, and a weight of 38.1 g/m².

The second thermoformable sheet further included an adhesive layer (not shown) disposed between inner layer 120 and interior sealing layer 150. The adhesive layer had a thickness of 4 microns and a weight of 4.5 g/m².

Composition, barrier properties, and seal properties of the second thermoformable sheet are summarized in Tables 3 and 4 below.

TABLE 3

Composition and Barrier Properties for Example 2

| Properties | Unit | Value | Test Method |
|---|---|---|---|
| Composition | | | |
| Polyethylene | g/m² | 24.1 | ASTM D-4321 |
| Ink | g/m² | — | ASTM D-4321 |
| Adhesive | g/m² | 4.5 | ASTM D-4321 |
| Polyethylene | g/m² | 198.6 | ASTM D-4321 |
| Adhesive | g/m² | 4.5 | ASTM D-4321 |
| Polyethylene - EVOH - Peel | g/m² | 38.1 | ASTM D-4321 |
| Total Weight | g/m² | 269.7 | ASTM D-4321 |
| Total Thickness | μm | 273 | ASTM D-374 |
| Barrier Properties | | | |
| Water Vapor Transmission Rate (WVTR @ 38° C. & 90% RH) | g/m² · d | 0.5 | ASTM E-96 |
| Oxygen Transmission Rate (OTR @ 23° C. & 50% RH) | cm³/m² · d · atm | 1 | ASTM D-3985 |

Referring to Table 3, the second thermoformable sheet had a WVTR of 0.5 g/m²·d at 38° C. & 90% RH. Further, the second thermoformable sheet had an OTR of 1 cm³/m²·d·atm at 23° C. & 50% RH.

TABLE 4

Heat Sealing Properties for Example 2

| Seal Temperature (° C.) | MD Seal Strength (N/15 mm) | CD Seal Strength (N/15 mm) |
|---|---|---|
| 120 | 0 | 0 |
| 130 | 0.62 | 0.40 |
| 140 | 1.49 | 1.12 |
| 150 | 2.57 | 2.64 |
| 160 | 2.95 | 3.52 |
| 170 | 3.32 | 3.81 |
| 180 | 3.69 | 4.04 |

Referring to Table 4, the thermoformable sheet of Example 2 was tested for sealing properties according to ASTM F88. Heat seals were created between the interior sealing layers of two samples of Example 2 sheet. Heat seal conditions: two heated seal bars (top/bottom), time=1 second, pressure=400N/20 cm². Seal strength was testing using a pulling speed of 300 mm/min, in the direction indicated (MD=machine direction, CD=cross direction), across a cut sample having a width of 15 mm. Seal strength reported is the mean of three independent measurements. It was noted that at sealing temperatures of 170° C. and 180° C. slight sticking to the seal bar occurred.

The first and second thermoformable sheets of Examples 1 and 2, respectively, were thermoformed into complicated structures (e.g., package 200 as shown in FIG. 2A) without showing any cracks or other defects. Further, the first and second thermoformable sheets did not show any damage upon heat sealing. Moreover, each of the first and second thermoformable sheets were recyclable.

What is claimed:

1. A thermoformable sheet comprising:
    an exterior film, the exterior film comprising between 50% and 100% polyolefin-based polymers, by weight;
    a printed pigment layer;
    an adhesive layer;
    an inner layer comprising between 60% and 100% of high-density polyethylene polymer, by weight, the inner layer comprising a thickness between 100 microns and 350 microns; and
    an interior sealing layer;
    wherein the printed pigment layer and the adhesive layer are located between the exterior film and the inner layer, and
    the inner layer is unoriented.

2. The thermoformable sheet according to claim 1, wherein the exterior film is oriented.

3. The thermoformable sheet according to claim 1, wherein the exterior film is unoriented.

4. The thermoformable sheet according to claim 1, wherein the exterior film comprises between 50% and 100% polyethylene-based polymers, by weight.

5. The thermoformable sheet according to claim 1, wherein the exterior film comprises between 50% and 100% polypropylene-based polymers, by weight.

6. The thermoformable sheet according to claim 1, wherein the printed pigment layer is directly adjacent to the exterior film.

7. The thermoformable sheet according to claim 1 further comprising a thickness between 200 microns and 500 microns.

8. The thermoformable sheet according to claim 1, wherein the inner layer further comprises between 2.5% and 30% of a hydrocarbon resin, by weight.

9. The thermoformable sheet according to claim 1, wherein the interior sealing layer comprises polyethylene-based polymers.

10. The thermoformable sheet according to claim 1, wherein the interior sealing layer comprises polypropylene-based polymers.

11. The thermoformable sheet according to claim 1, further comprising an overall composition of polyolefin of between 80% and 100%, by weight.

12. The thermoformable sheet according to claim 1, further comprising an overall composition of polyethylene of between 80% and 100%, by weight.

13. The thermoformable sheet according to claim 1, further comprising a barrier layer comprising an ethylene vinyl alcohol copolymer.

14. A thermoformable sheet comprising:
   an exterior film, the exterior film comprising an oriented polyethylene-based film comprising a thickness between 6 microns and 50 microns;
   a printed pigment layer deposited directly on a surface of the exterior film;
   an adhesive layer;
   an inner layer comprising between 60% and 100% of high-density polyethylene polymer, by weight, the inner layer comprising a thickness between 100 microns and 350 microns; and
   an interior sealing layer comprising a polyethylene polymer; and
   wherein the printed pigment layer and the adhesive layer are located between the exterior film and the inner layer.

15. A thermoformed package containing a product, the package comprising the thermoformable sheet according to claim 14, wherein the thermoformable sheet is thermoformed to create a product cavity.

16. The thermoformed package containing a product according to claim 15, wherein the package consists of:
   the thermoformable sheet folded over on itself, and
   a seal formed by bonding the interior sealing layer of the thermoformable sheet to itself.

17. The thermoformed package containing a product according to claim 15, wherein the thermoformable sheet comprises a first thermoformable sheet and a second thermoformable sheet, and wherein the package consists of: the first and second thermoformable sheets, a seal bonding the interior sealing layer of the first thermoformable sheet to the interior sealing layer of the second thermoformable sheet, and the product cavity located between the first and second thermoformable sheets.

18. A thermoformed package containing a product, the package comprising the thermoformable sheet according to claim 1, wherein the thermoformable sheet is thermoformed to create a product cavity.

19. The thermoformed package containing a product according to claim 18, wherein the package consists of:
   the thermoformable sheet folded over on itself, and
   a seal formed by bonding the interior sealing layer of the thermoformable sheet to itself.

20. The thermoformed package containing a product according to claim 18, wherein the thermoformable sheet comprises a first thermoformable sheet and a second thermoformable sheet, and wherein the package consists of: the first and second thermoformable sheets, a seal bonding the interior sealing layer of the first thermoformable sheet to the interior sealing layer of the second thermoformable sheet, and the product cavity located between the first and second thermoformable sheets.

\* \* \* \* \*